INVENTOR.
JOE P. MINICI

May 12, 1959

J. P. MINICI 2,885,911

FILING JIG FOR SAW BLADES

Filed March 19, 1956

INVENTOR.
JOE P. MINICI

BY

*Elmer Jamison Gray*
ATTORNEY.

May 12, 1959   J. P. MINICI   2,885,911
FILING JIG FOR SAW BLADES
Filed March 19, 1956   3 Sheets-Sheet 3

INVENTOR.
JOE P. MINICI
BY
Elmer Jamison Gray
ATTORNEY

United States Patent Office 2,885,911
Patented May 12, 1959

2,885,911

FILING JIG FOR SAW BLADES

Joe P. Minici, Douglas, Ariz.

Application March 19, 1956, Serial No. 572,397

8 Claims. (Cl. 76—31)

This invention relates to saw filing jigs and is particularly directed to a device for use in jointing and sharpening raker and cutting teeth of circular saw blades, as well as dado heads and saws without raker teeth.

A primary object of the invention resides in the provision of a portable filing jig with a multi-position file guide and an adjustable saw support for fast, accurate sharpening of circular blades, together with novel means for mounting the file guide for universal movement without change in adjustment to guide the file in all exact paths required to accurately sharpen a combination blade, and means to gage and limit the depth of filing so that all types of teeth may be properly and uniformly sharpened.

Another object of the invention resides in the provision of a jig which includes an upright supporting frame having a slotted vertical column terminating a horizontal table, the column being provided with an adjustable arbor for positioning a saw blade with its upper teeth above the table, and the table supporting a file guide rearwardly of the column and having universal movement to permit a file to assume a plurality of positions and be guided in accurate paths with respect to the teeth of the saw blade. The table is further provided with a combined horizontally pivotal gage plate and stop member for controlling the filing depth of the file while preventing turning of the blade, and a depth gage rotatably mounted in the path of the file to control the sharpening action of the file on the teeth of the saw blade.

Further objects and advantages will become apparent from a study of the following description when taken in connection with the accompanying drawings intended to be illustrative rather than restrictive, and in which.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the accompanying drawings there is illustrated a filing jig especially adapted for the purpose of sharpening the blades of circular saws. This filing jig comprises, as basic features thereof, an upright support or frame upon which are mounted a file guide and swivel arm assembly, a depth gage roller, a gage plate and an adjustable saw arbor.

Figure 2:
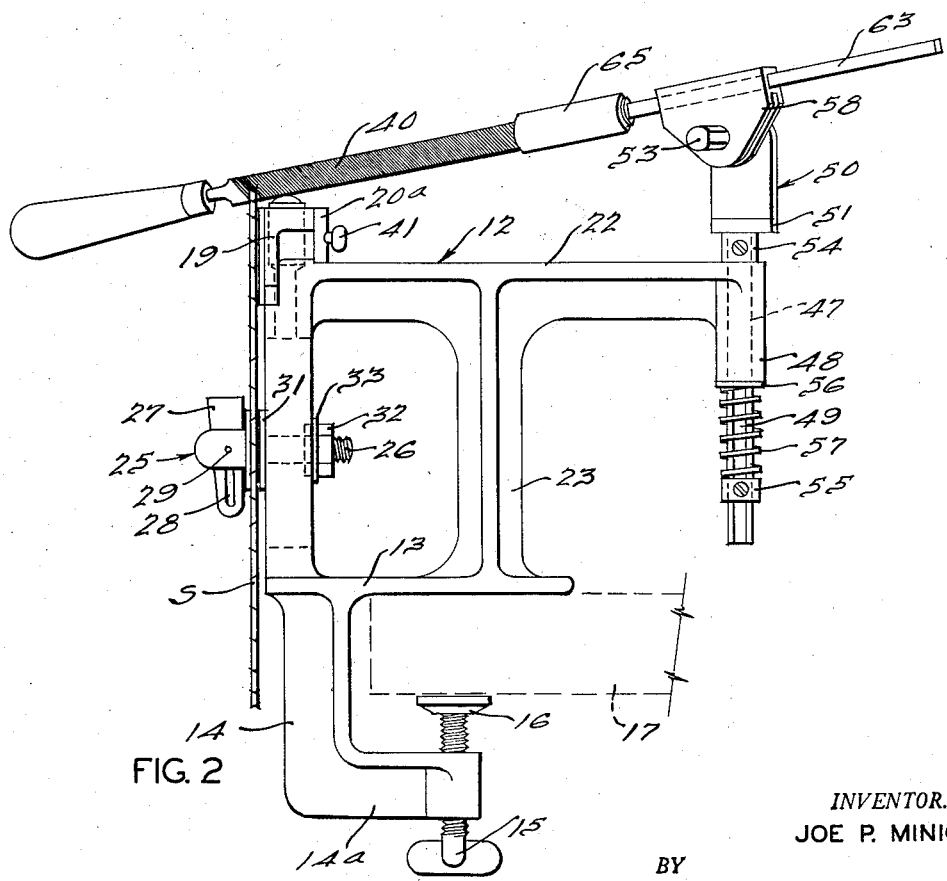
Fig. 2 is a side elevation of the jig with the file shown in the same position as in Fig. 1.

Referring particularly to Fig. 2, the frame, indicated generally at 12, may be cast from suitable metal, such as aluminum. This frame is provided with a flat base 13 from which integrally depends a clamping member 14 terminating at its lower end in a rearwardly extending clamping arm 14a. Vertically adjustable in a tapped hole in the end of arm 14a is a wing screw 15 carrying at its upper end a washer 16. Adjustment of the wing screw serves to clamp the jig to a bench or table top 17. Extending integrally from the base 13 is a slotted vertical column 18 the upper end of which is laterally enlarged at opposite sides to provide a vertical face plate 19 terminating along its upper edge in a transversely extending horizontal gage plate table 20. A replaceable facing 21 of rubber or other suitable material is cemented or otherwise secured to the vertical face plate 19 to act as a cushion for the saw blade, protect the saw teeth and absorb the wear to which the frame would otherwise be subjected. The one-piece frame 12 is formed with a rearwardly extending horizontal swivel-bearing support arm 22 which is integrally connected to the frame base 13 by a pedestal 23.

Vertical column 18 is provided with a vertical slot 24 (Fig. 5) and serves as a guide and support for an adjustable saw arbor or support 25 for the circular saw. This arbor can be adjusted and clamped at any desired elevation in the slot 24 to accommodate saws of various diameters such, for example, as saws from five to ten inches in diameter. This adjustment is such that any blade within the diameter limits may be positioned so that its upper teeth project above the table 20, see Figs. 2 and 4.

The adjustable saw arbor 25 has an enlarged outer end portion transversely slotted at 25a. Extending from this end portion is a threaded shaft 26 which is reduced in diameter to fit in slot 24 and to form an annular shoulder adapted to abut the edges of the column 18 at opposite sides of the slot, see Fig. 5. A tapered key 27 extends through the slot 25a and is provided with an interior slot 28 through which extends a key pin 29 for holding the key in the slot. Mounted on the arbor are a pair of washers 30 and 31 adapted to be disposed at opposite sides of the saw blade when mounted in position, as shown in Fig. 2. The arbor 25 is adapted to be clamped in properly adjusted position by means of a retaining nut 32 and washer 33, the nut being threaded onto the inner projecting end portion of the threaded shaft 26. The arbor is clamped in position or unclamped by turning the threaded shaft 26 in the retaining nut 32, using the tapered key 27 as a handle or wrench.

Figure 1:
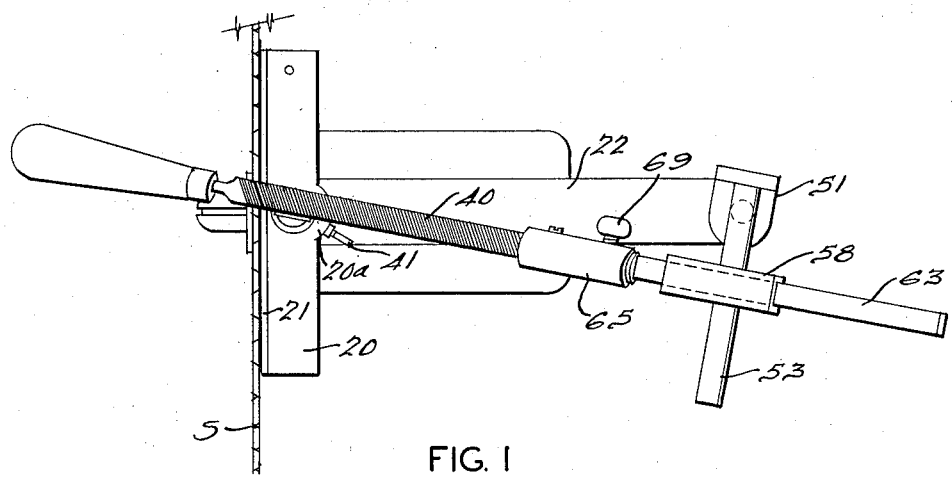
Fig. 1 is a top plan view of a jig showing the saw blade and file with the slide guide in the upper right-hand position for filing cross-cut teeth.
Figure 3:
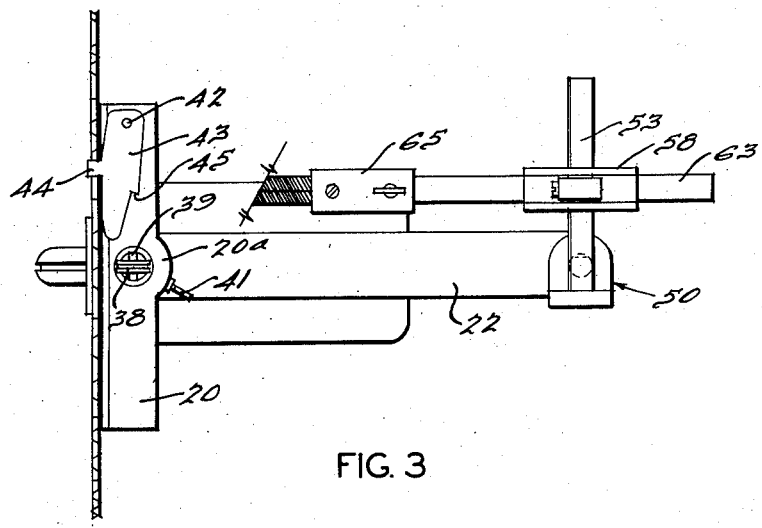
Fig. 3 is a view similar to Fig. 1 but showing the saw and gage plate with the slide guide in the lower left-hand position for filing raker teeth or similar teeth having a flat back.
Figure 4:
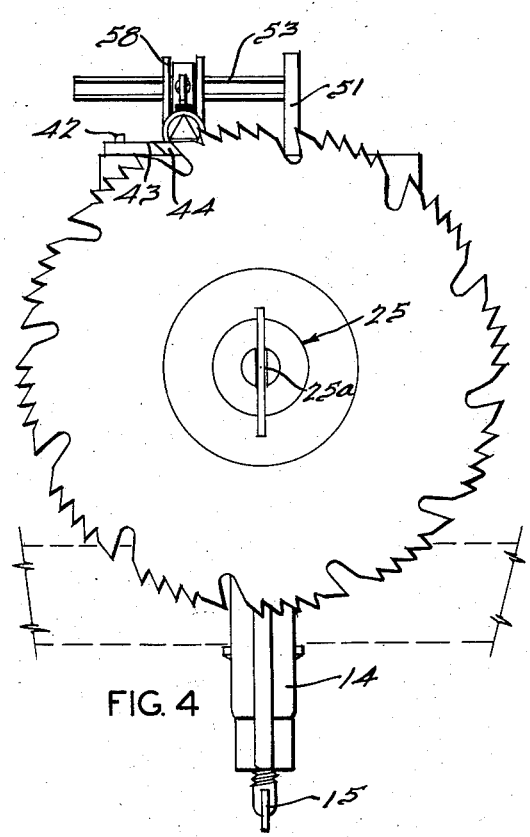
Fig. 4 is a front elevation of the jig with a combination blade and the slide guide in the position illustrated in Fig. 3.
Figure 5:
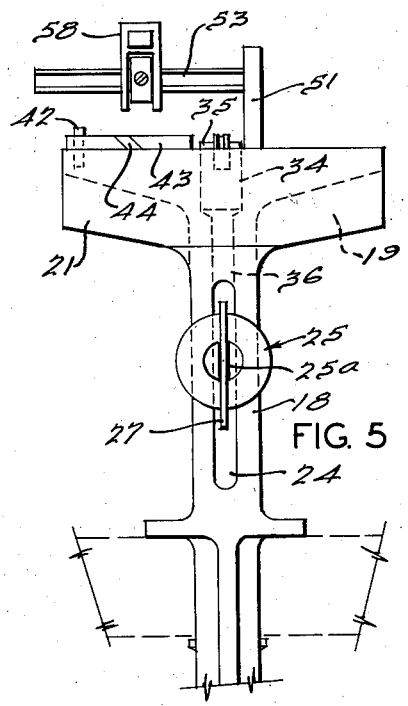
Fig. 5 is a front elevation of the jig showing the slotted vertical column, adjustable arbor, faceplate, gageplate and slide guide in the upper left-hand filing position.
Figures 7, 11:
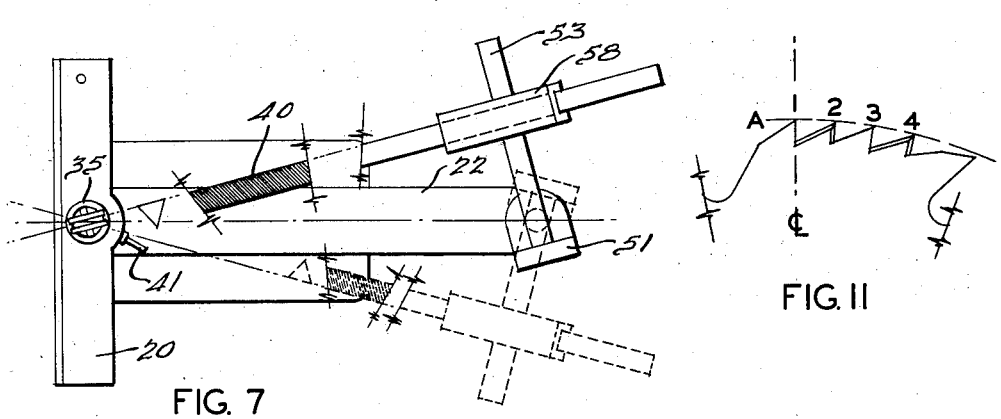
Fig. 7 is a plan view similar to Fig. 1 with solid lines showing the slide guide in the upper left-hand position, and dotted lines showing the slide guide in the upper right-hand position for filing cross-cut teeth.
Fig. 11 is a side view of a group of teeth from a combination blade.
Figures 8, 9, 10:
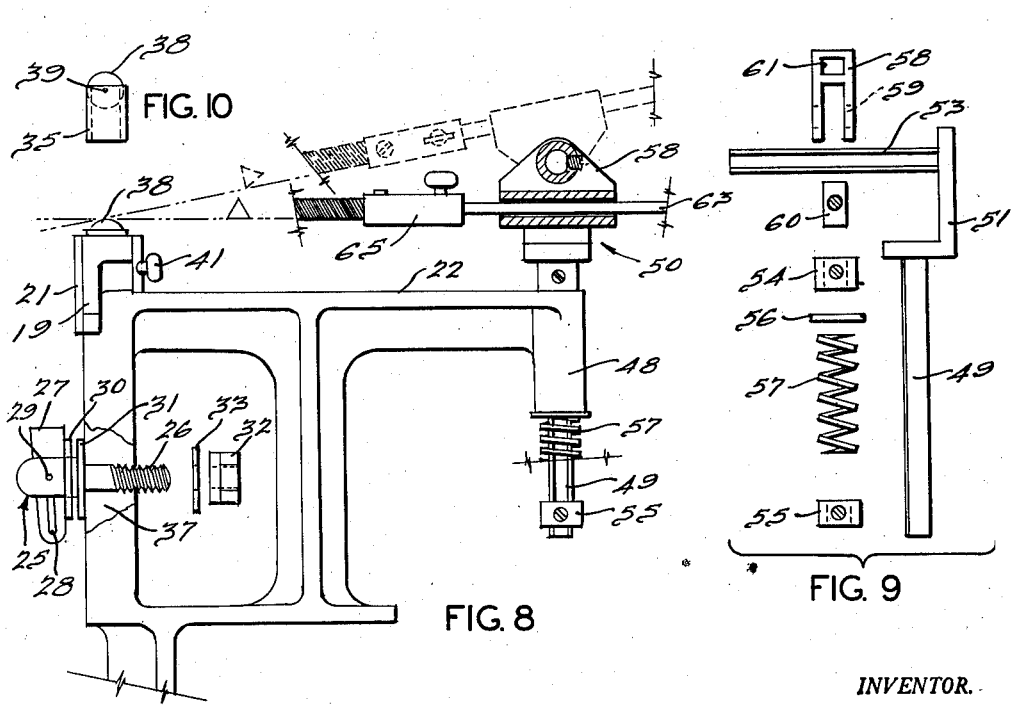
Fig. 8 is a fragmentary side elevation with cut-away sections showing details of construction.
Fig. 9 is an exploded view of the swivel arm and slide guide parts.
Fig. 10 is an elevation of the depth gage roller assembly.

The gage plate table 20 is provided centrally thereof with a cylindrical hole 34 (Fig. 5) which serves as a bearing for a depth gage roller supporting sleeve 35 (Fig. 1). Communicating with the hole 34 is a vertical hole 36 of smaller diameter which communicates at its lower end with the open inner side or vertical slot 34 of the column 18. The supporting sleeve 35 carries at its upper end a grooved depth gage roller 38 revolubly mounted in the sleeve by means of a pin 39. Roller 38 serves to position the near end of the file 40 laterally and vertically as shown in Figs. 7 and 8 for filing cross-cut teeth and jointing blades. The depth gage supporting sleeve 35 is adapted to be turned within the hole 34 to adjust angularly the position of the grooved roller 38 and is held in such position by means of a thumbscrew 41 which screws through a threaded opening in a boss 20a extending from the gage plate table 20. Driven into a vertical hole adjacent one end of the table member 20 and projecting thereabove in fixed position is a pivot pin 42. A gage plate or member 43 is apertured at one end to slip over the pin 42 and can be turned horizontally around the pin as desired. It will be understood that gage plates of different types can be used for different tooth shapes. The gage plate 43, illustrated in Figs. 3, 4 and 5, is adapted to be used for raker teeth or dado chippers on blades up to ten inches in diameter. At opposite edges the gage member 43 is formed with projections 44 and 45 one or the other of which is adapted to engage one edge of a saw blade tooth and thus serve as an abutment to prevent turning of the saw blades in one direction, the foregoing being clearly indicated in Figs. 3 and 4. The upper surface of the gage member 43 serves as a depth gage to control the filing of the cutting edge of all teeth of the saw to the same radius for each setting of the adjustable saw arbor 25.

A vertical hole 47 drilled in a swivel arm bearing boss 48, integral with the outer end of support arm 22, serves as a bearing for shaft 49 of swivel arm 50, as shown in Fig. 2. To the upper end of vertical swivel arm shaft 49 is welded or otherwise secured a clip angle 51 for supporting a horizontal swivel arm shaft 53. Vertical shaft 49 is adjustable in the bearing 47 and its position is determined by the location of upper collar 54 and lower collar 55. A friction washer 56 and spring 57 act as a brake to partially restrain rotation of vertical swivel arm shaft 49 in bearing 47. Horizontal shaft 53 is the supporting arm for a slide guide 58 which is free to be rotated around the shaft on its bearing 59. Location of guide 58 laterally on shaft 53 is fixed by the setting of collar 60.

The slide guide 58 is provided with an aperture 61, at right angles to shaft 53, forming a bearing for slide rod 63. Although the slide rod and bearing opening are illustrated as being rectangular in cross-section, they may be square, triangular or any other shape to prevent the slide rod from turning in the bearing while permitting the slide rod to be moved back and forth in the bearing.

Figure 6:
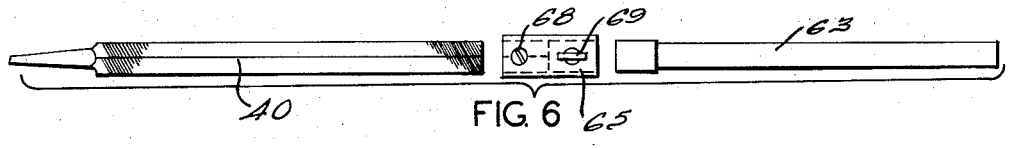
Fig. 6 is an exploded view of a sixty degree triangular blunt file, file adapter and slide rod.

As shown in Fig. 6, the slide rod 63 is provided at one end with a comparatively short cylindrical adapter portion 64 of a diameter to be received in a sleeve 65 which has a cylindrical opening in one end and a triangular opening in the other end. The slide rod 63, adapter portion 64, sleeve 65 and triangular file 40 are arranged so that the longitudinal axis of the file and slide rod lie in a straight line when the file is clamped to the sleeve by tightening a set screw 68 and the sleeve is clamped to the adapter portion 64 by tightening a thumbscrew 69. While the file 40 may be held in one of three positions in the triangular opening in sleeve 65, the other end of the sleeve may be clamped at any position around the adapter portion 64. Thus, the file may be adjusted to any fixed angle about its longitudinal axis.

Figs. 7 and 8 show how the path of the file is controlled. It will be noted that the file 40 travels in a line established by two points, a fixed point and an adjustable point. The point of contact of file 40 on depth gage roller 38 is for all practical consideration a fixed point. The adjustable point lines along the axis of slide rod 63 and is determined by the position and lateral location of slide guide 58 on horizontal swivel arm shaft 53.

The elevation of horizontal swivel arm shaft 53, as shown in Fig. 8, is determined in conjunction with the dimensions of slide guide 58 to establish file travel in two selected planes. In its lower position the slide guide establishes the path of the file in a horizontal plane. In its upper position the slide guide establishes the path of the file in a plane which will produce a set, predetermined average bevel on the back of cross-cut teeth.

Normally slide guide 58 will be set at either of two locations on horizontal swivel arm shaft 53. The center location is directly over vertical swivel arm shaft 49. The outer location is at the correct lateral distance from vertical swivel arm shaft 49 to produce a predetermined average bevel on the face of cross-cut teeth. The slide guide 58 is set at its center location for either of two operations. The lower center position is used for jointing operations. The upper center position is used for sharpening M shaped teeth such as found on dado blades.

The outer location of the slide guide 58 produces four basic filing positions. The upper left and upper right filing positions are used for sharpening cross-cut teeth. The lower left filing position can be used for sharpening raker or similar type teeth as illustrated in Fig. 4. The lower right filing position can be used in a like manner if the jig is provided with a gage plate 43 on the right-hand side of the gage plate table 20.

In operation, a saw blade S is mounted clockwise on arbor 25 by lifting double taper key 27, swinging it out around pin 29 to its horizontal position, slipping blade S and take-up washer 30 over the key and arbor, then swinging the taper key into the vertical position shown in Fig. 2. With the slide guide 58 in its lower center position as shown in Fig. 8, and file 40 adjusted so a bottom face is horizontal, the arbor 25 is unscrewed a couple of turns. The blade is then raised to an elevation at which the point of the lowest cross-cut tooth on the circumference of the saw just touches the bottom face of the file as the file rests on depth gage roller 38. Arbor 25 is screwed tight and taper key 27 is pushed down and wedged snugly between pin 29, and take-up washer 30. As the blade is slowly rotated by hand the point of each tooth is flattened to the radius of the lowest cross-cut tooth as determined by depth gage roller 38. The arbor is then raised 1/64" to 1/32", as desired, and the cutting edge of each raker tooth is filed to this radius.

Following the foregoing jointing operations, the blade is ready for sharpening. The slide guide 58 is turned to its upper left-hand position and the sixty degree file 40 adjusted so its left-hand face is vertical and its lower corner rests in the groove of the depth gage roller as shown by the solid lines in Fig. 7.

Each group of teeth on the saw blade S illustrated consists of four cross-cut teeth and a raker tooth as shown in Fig. 11. The spearpoint at the tip of each cross-cut tooth is formed by the bevel on the back and front face of the tooth. The chisel-edge of the raker tooth is formed by the flat (no bevel) back and face of the tooth. The V-shaped space between teeth is a gullet. The blade is rotated until the gullet between a No. 1 and a No. 2 tooth is under the file. The blade is then adjusted vertically so the bottom corner of the file resting in the gullet is about 1/16" above the bottom of the groove in depth gage roller 38.

Reference to Fig. 11 indicates how this will place the vertical face of the file 40 in contact with the front face of No. 1 cross-cut tooth on the vertical center line of the saw blade. The blade S is held in this position against rubber facing 21 with the left hand, while the right hand is used to operate the file. Each forward stroke of the file removes metal simultaneously from the front face of No. 1 tooth and from the back face of No. 2 tooth. The path of the file, fixed by the position of the slide guide 58, and the location of the file 40 just above the groove in the depth gage roller 38, produces a constant bevel on the back of No. 2 tooth and the front face of No. 1 tooth. The shape of the gullet is also constant since it is formed by the fixed sixty degree angle between the vertical face and lower face of the file which is restrained from rotation around its longitudinal axis.

Downward pressure on the file is shifted slightly to the right or left to maintain the same height on No. 1 and No. 2 teeth and a constant pitch or distance between teeth. Filing is continued until a sharp point just forms at the tip of No. 2 tooth where it was flattened to a common radius in the jointing operations. The file is lifted out of the gullet and the blade rotated counter-clockwise so the gullet between No. 3 and No. 4 tooth is under the file. The filing operation is repeated as for No. 1 and No. 2 teeth. The same procedure is repeated for the remaining groups of teeth as the blade is rotated counterclockwise. The saw blade is then turned over on the arbor, the swivel arm 50 is swung to the right side, the file 40 and slide rod assembly removed from the slide guide 58 and reinserted with vertical face of the file on the right as shown by the dotted lines in Fig. 7. The depth gage assembly is turned so the groove in the roller 38, lines up with the path of the file.

With the file in the position shown in Figs. 1 and 2 the blade is rotated clockwise until the back of a No. 1 cross-cut tooth comes in contact with the bottom of the file as the file rests in the groove of the depth gage roller 38. The back of the tooth is filed until a point just forms at its tip. The file is lifted and the blade rotated so the gullet between No. 2 and No. 3 tooth is under the file. The file is lowered into the gullet and filing continued until a point just forms at the tip of No. 3 tooth. The file is lifted out of the gullet and the blade rotated so the gullet between No. 4 tooth and the raker tooth is under the file. The file is lowered into the gullet and filing continued until the gullet is the same depth as other gullets in the group. The same procedure is repeated for the remaining groups of teeth as the blade is rotated clockwise. This completes the filing operation of the cross-cut tooth.

The slide guide 58 and swivel arm 50 are turned to the lower left-hand position, the file adjusted so its bottom face is horizontal, and the blade is elevated so a raker tooth is located as shown in Figs. 3 and 4 with its back slightly above the gage plate. The back of the tooth is filed down in a horizontal plane until the flat spot made in the jointing operation just disappears forming a sharp chisel edge at the tip of the raker tooth. The same procedure is repeated for the remaining raker teeth as the blade is rotated clockwise. This completes the sharpening operation.

I claim:

1. In a jig for jointing and sharpening the teeth of a circular saw blade, the combination of a supporting frame having a vertical column and a horizontal table, means for adjustably mounting a saw blade on said vertical column so that the upper teeth of the blade are above the table, a slide guide rearwardly of said column having universal movement with respect to said table, means for reciprocably mounting a file in said slide guide, a gage plate pivotally mounted on the table and having a stop against which the saw teeth abut to prevent lateral movement of the saw blade, and a depth gage rotatably mounted on said table to limit the sharpening action of a file in said slide guide.

2. In a jig for jointing and sharpening the teeth of a circular saw blade, the combination of a supporting frame having a vertical column and a horizontal table, means for adjustably mounting a saw blade on said vertical column so that the upper teeth of the blade are above the table, a slide guide rearwardly of said column having a swivel connection with said table, means for reciprocably mounting a file in said slide guide, a gage plate pivotally mounted on the table to limit lateral movement of the upper portion of the saw blade, and a depth gage rotatably mounted on said table to limit the sharpening action of a file in said slide guide.

3. A saw filing jig including an upright supporting frame having a vertical column terminating in a transverse face plate and a horizontal table, means for mounting a saw blade on said column so that the upper teeth of the saw blade are above the table, saw cushioning means on said face plate, a file guide mounted on said table rearwardly of said column, a depth gage rotatably mounted on said table between said saw mounting means and said file guide, and means for reciprocably mounting a file in said file guide to overlie said depth gage and the teeth of a saw blade mounted on said column.

4. A filing jig for a circular saw blade comprising a supporting frame having a front upright frame member and a support member disposed laterally and rearwardly thereof, saw blade mounting means mounted on said frame member for vertical adjustment to position the upper teeth of the blade in predetermined position above the upper portion of said frame member, a file slide guide disposed rearwardly of said frame member, a swivel connection between said slide guide and support member, means for reciprocably mounting the outer end of a file in said slide guide and for holding the file against turning movement relative thereto, and a gage member pivotally mounted on said frame member adjacent the upper teeth of the blade and effective to position the inner end of the file during the filing action thereof.

5. A filing jig for a circular saw blade comprising a supporting frame having a front upright frame member and a support member disposed laterally and rearwardly thereof, saw blade mounting means mounted on said frame member for vertical adjustment to position the upper teeth of the blade in predetermined position above the upper portion of said frame member, a protecting layer interposed between said saw blade and frame member, a file slide guide disposed rearwardly of said frame member, a swivel connection between said slide guide and support member, means for reciprocably mounting the outer end of a file in said slide guide and for holding the file against turning movement relative thereto, and a gage member pivotally mounted on said frame member adjacent the upper teeth of the blade and effective to position the inner end of the file during the filing action thereof.

6. A filing jig for a circular saw blade comprising a supporting frame having a front upright frame member and a support member disposed laterally and rearwardly thereof, saw blade mounting means mounted on said frame member for vertical adjustment to position the upper teeth of the blade in predetermined position above the upper portion of said frame member, a file holder adapted to be secured to the outer end of the file for reciprocably mounting the same within said slide guide and for holding the file against turning movement relative thereto, and angularly adjustable gage means mounted on said frame member adjacent the upper teeth of the blade and effective to position the inner end of the file during the filing action thereof.

7. A filing jig for a circular saw blade comprising a supporting frame having a front upright frame member and a support member disposed laterally and rearwardly thereof, saw blade mounting means mounted on said frame member for vertical adjustment to position the upper teeth of the blade in predetermined position above the upper portion of said frame member, a protecting layer interposed between said saw blade and frame member, a file guide mounted on said support member rearwardly of said frame member, a depth gage on said frame member, and means for reciprocably mounting a file in said file guide to overlie said depth gage and the teeth of the saw blade.

8. A filing jig for a circular saw blade comprising a supporting frame having a front upright frame member and a support member disposed laterally and rearwardly thereof, saw blade mounting means mounted on said frame member for vertical adjustment to position the upper teeth of the blade in predetermined position above the upper portion of said frame member, a file slide guide disposed rearwardly of said frame member, a swivel connection between said slide guide and support member, means for reciprocably mounting the outer end of a file in said slide guide and for holding the file against turning movement relative thereto, a gage member pivotally mounted on said frame member adjacent the upper teeth of the blade and effective to position the inner end of the file during the filing action thereof, and means on said frame member for releasably holding the blade against rotative movement.

References Cited in the file of this patent

UNITED STATES PATENTS

| Number | Name | Date |
|---|---|---|
| 87,289 | Rathbun | Feb. 23, 1869 |
| 98,447 | Tyson | Dec. 28, 1869 |
| 147,057 | Iseminger | Feb. 3, 1874 |
| 162,356 | Doyle | Apr. 20, 1875 |
| 209,849 | Allington | Nov. 12, 1878 |
| 256,360 | Muncaster | Apr. 11, 1882 |
| 361,485 | Boughton et al. | Apr. 19, 1887 |
| 735,100 | Hormby | Aug. 4, 1903 |
| 1,435,954 | Carron | Nov. 21, 1922 |
| 1,531,350 | Sloan | Mar. 31, 1925 |
| 2,171,169 | Woodbury | Aug. 29, 1939 |